United States Patent
Suh et al.

(10) Patent No.: US 11,711,245 B2
(45) Date of Patent: Jul. 25, 2023

(54) APPARATUS AND METHOD FOR CHANNEL EQUALIZATION BASED ON ERROR DETECTION

(71) Applicant: SAMSUNG ELECTRONICS CO., LTD., Suwon-si (KR)

(72) Inventors: Youngseob Suh, Goyang-si (KR); Byungwook Cho, Hwaseong-si (KR); Donghyuk Lim, Seoul (KR); Junghoon Chun, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 50 days.

(21) Appl. No.: 17/243,683

(22) Filed: Apr. 29, 2021

(65) Prior Publication Data
US 2022/0086028 A1    Mar. 17, 2022

(30) Foreign Application Priority Data
Sep. 11, 2020   (KR) .................. 10-2020-0117045

(51) Int. Cl.
*H04L 25/03*    (2006.01)

(52) U.S. Cl.
CPC .. *H04L 25/03178* (2013.01); *H04L 25/03057* (2013.01)

(58) Field of Classification Search
CPC . H03H 7/30; H03H 7/40; H03M 1/12; H03M 13/00; H03M 13/41; H04B 1/00;
(Continued)

(56) References Cited

U.S. PATENT DOCUMENTS 6,535,554 B1    3/2003   Webster et al.
6,563,858 B1    5/2003   Fakatselis et al.
(Continued)

FOREIGN PATENT DOCUMENTS

| JP | 2005-159466 | 6/2005 |
|---|---|---|
| KR | 10-1078994 | 10/2011 |
| KR | 10-1103165 | 12/2011 |

OTHER PUBLICATIONS

M. Vedat Eyuboglu, et al., "Reduced-State Sequence Estimation With Set Partitioning and Decision Feedback", IEEE Transactions on Communication, vol. 36, No. 1, Jan. 1988, pp. 13-20.

*Primary Examiner* — Shawkat M Ali
(74) *Attorney, Agent, or Firm* — F. Chau & Associates, LLC

(57) ABSTRACT

An apparatus includes an equalization circuit, an error prediction circuit, a sequence estimation circuit, and a selection circuit. The equalization circuit is configured to generate a first data sequence and a first equalized signal from an input signal received through a channel. The error prediction circuit is configured to predict an error based on the first equalized signal when the error is predicted. When the error is predicted, the sequence estimation circuit is configured to generate a second data sequence from the first data sequence and the predicted error. The selection circuit is configured to output the second data sequence when the predicted error is determined to be an actual error and to otherwise output the first data sequence.

18 Claims, 14 Drawing Sheets

(58) Field of Classification Search
CPC .... H04B 1/69; H04B 3/00; H04L 1/00; H04L 25/03; H04L 25/03057; H04L 25/03178; H04L 27/06
USPC .......................................... 375/229–236, 341
See application file for complete search history.

(56) References Cited

U.S. PATENT DOCUMENTS

| | | |
|---|---|---|
| 6,618,451 B1 | 9/2003 | Gonikberg |
| 6,707,850 B1 | 3/2004 | Blake et al. |
| 7,266,146 B2 | 9/2007 | Pare, Jr. et al. |
| 7,852,915 B2 | 12/2010 | Chen |
| 8,681,910 B2 | 3/2014 | Yang |
| 2012/0051418 A1* | 3/2012 | Yang ................ H04L 25/03292 375/233 |
| 2020/0106648 A1 | 4/2020 | Medra et al. |

* cited by examiner

APPARATUS AND METHOD FOR CHANNEL EQUALIZATION BASED ON ERROR DETECTION

CROSS-REFERENCE TO RELATED APPLICATION

This U.S. non-provisional patent application claims the benefit of priority under 35 U.S.C. § 119 to Korean Patent Application No. 10-2020-0117045, filed on Sep. 11, 2020, in the Korean Intellectual Property Office, the disclosure of which is incorporated by reference in its entirety herein.

1. TECHNICAL FIELD

The inventive concept relates to channel equalization, and more particularly, to an apparatus and method for channel equalization based on error detection.

2. DISCUSSION OF RELATED ART

In digital transmission, the number of bit errors is the number of bits of a data stream over a communication channel that have been altered due to noise or distortion. A bit error rate (BER) is the number of bit errors per unit time. The BER may increase due to an increase in data rate. Channel equalization may be used to reduce the BER. Channel equalization refers to techniques for compensating for distortion caused by a channel so that a receiver can accurately identify a signal transmitted by a transmitter. Accordingly, the receiver and/or the transmitter may include a structure for performing channel equalization. The BER may increase not only due to signal distortion by the channel, but also due to noise generated in the channel. However, channel equalization is not very effective at reducing the BER due to such noise.

SUMMARY

At least one embodiment of the inventive concept of the disclosure provides an apparatus and method for performing channel equalization based on detection of an error caused by noise.

According to an exemplary embodiment of the inventive concept of the disclosure, there is provided an apparatus including an equalization circuit, an error prediction circuit, a sequence estimation circuit, and a selection circuit. The equalization circuit is configured to generate a first data sequence and a first equalized signal from an input signal received through a channel. The error prediction circuit is configured to predict an error based on the first equalized signal. When the error is predicted, the sequence estimation circuit is configured to generate a second data sequence from the first data sequence and the predicted error. The selection circuit is configured to output the second data sequence when the predicted error is determined to be an actual error and to otherwise output the first data sequence.

According to an exemplary of the inventive concept of the disclosure, there is provided an apparatus configured to process an input signal including a series of symbols received through a channel. The apparatus includes an equalization circuit, a sequence estimation circuit, and a selection circuit. The equalization circuit is configured to generate a first data sequence from the input signal based on a decision feedback equalizer (DFE). The sequence estimation circuit is configured to generate a second data sequence from a non-equalized signal corresponding to the input signal based on the DFE, the second data sequence including at least one second symbol value different from at least one first symbol value included in the first data sequence. The selection circuit is configured to output the second data sequence when an error of the first data sequence is detected and to output the first data sequence when the error is not detected.

According to an exemplary embodiment of the inventive concept of the disclosure, there is provided a method of processing an input signal including a series of symbols received through a channel. The method includes: performing a channel equalization on an input signal to generate a first data sequence and a first equalized signal, predicting an error of the first data sequence based on the first equalized signal; generating a second data sequence from a non-equalized signal corresponding to the input signal based on the channel equalization, when the error is predicted; performing an error detection to detect an error in the first data sequence; outputting the second data sequence when the error is detected and otherwise outputting the first data sequence.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
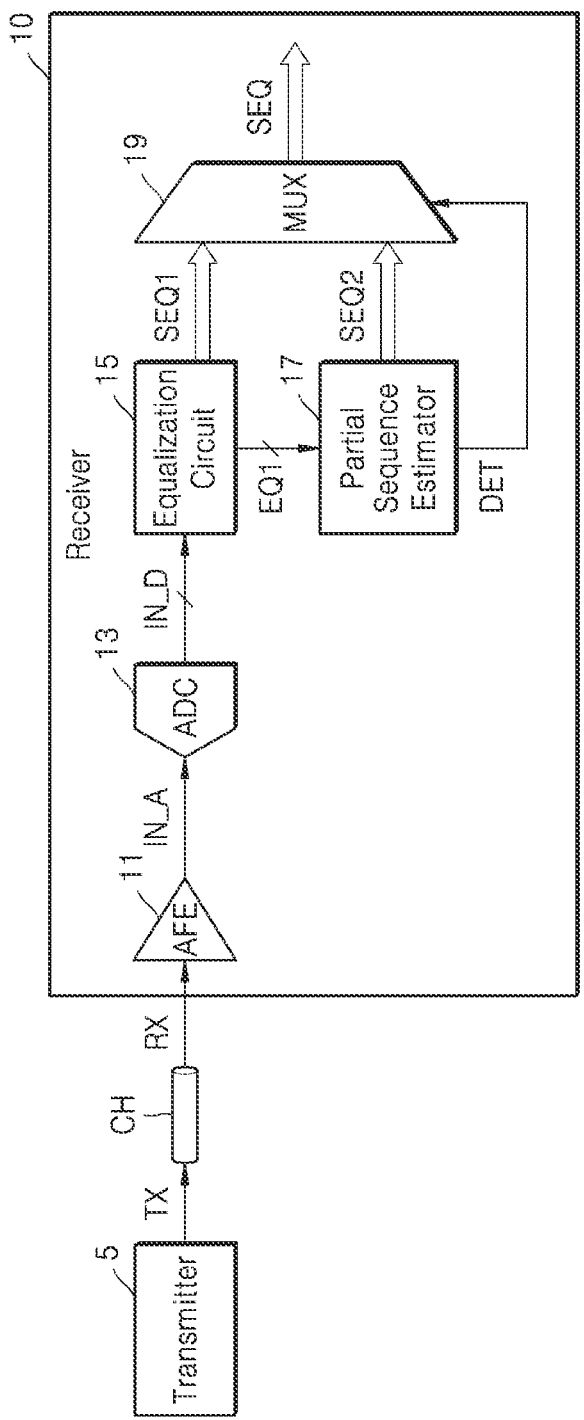
FIG. 1 is a block diagram of a receiver according to an exemplary embodiment of the disclosure.

FIG. 1 is a block diagram of a receiver 10 (e.g., a receiver device, a transceiver, etc.) according to an exemplary embodiment of the disclosure. As shown in FIG. 1, the receiver 10 may communicate with a transmitter 5 (e.g., a transmitter device, a transceiver, etc.) through a channel (communication channel or link) CH.

The transmitter 5 and the receiver 10 may refer to any objects that communicate with each other through the channel CH. For example, the transmitter 5 and the receiver 10 may be integrated circuits manufactured by a semiconductor process, and may be included in one package or may be included in different packages, respectively. In addition, the transmitter 5 and the receiver 10 may be included in one system, or may be included in separate systems connected through the channel CH.

The channel CH may refer to any medium for transmitting a signal. For example, the channel CH may include one or more cables for transmitting an electric signal or an optical signal, or may include patterns or wires formed on an integrated circuit or a printed circuit board (PCB). In some embodiments, the channel CH may be a serial communication channel, and may include differential signals or a clock signal. For example, the signal transmitted across the channel CH may be transmitted as differential signal, transmitted along with a clock signal, transmitted in synchronization with a clock signal, etc.

The transmitter 5 may output a transmission signal TX including information. For example, the transmitter 5 may encode information (i.e., a payload) to be transmitted to the receiver 10 and may generate the transmission signal TX by modulating encoded data. The transmitter 5 may employ any modulation scheme, and a high modulation order (e.g., multi-level signaling) may be employed for a high data rate. Accordingly, the transmission signal TX may include a series of symbols (or data symbols), and the information may be expressed as a value of a symbol, that is, a symbol value. Although the transmission signal TX is described herein as being modulated based on pulse amplitude modulation (PAM), exemplary embodiments of the disclosure are not limited thereto.

The transmission signal TX may be distorted through the channel CH, and accordingly, the receiver 10 may receive a reception signal RX different from the transmission signal TX. The transmitter 5 and/or the receiver 10 may include a structure for performing channel equalization to compensate for the distortion of a signal due to the channel CH. For example, the transmitter 5 may initialize access to the receiver 10, and may perform channel training (or link training) during the initialization process. The transmitter 5 may perform an initialization process that includes the channel training. In an embodiment of the channel training, the transmitter 5 transmits a symbol stream including a predefined series of symbols to the receiver 10, the receiver 10 samples the symbol stream, the receiver 10 calculates parameters representing characteristics of the channel CH from the sampled symbols, and the receiver 10 provides the calculated parameters to the transmitter 5. The transmitter 5 provides parameters for processing the reception signal RX to the receiver 10 based on the parameters provided from the receiver 10, and generates a transmission signal TX processed based on the parameters which are provided from the receiver 10 when the channel training ends.

The receiver 10 receives the reception signal RX through the channel CH, and performs channel equalization by processing the reception signal RX based on the parameters provided from the transmitter 5. As shown in FIG. 1, the receiver 10 may include an analog front-end (AFE) circuit 11, an analog-to-digital converter (ADC) 13, an equalization circuit 15, a partial sequence estimator 17 (e.g., a digital signal processor, a microprocessor, a processor, a logic circuit, etc.), and a multiplexer 19.

The AFE circuit 11 may receive the reception signal RX through the channel CH and may output an analog input signal IN_A. For example, the AFE circuit 11 may generate the analog input signal IN_A by amplifying the reception signal RX. The AFE circuit 11 may include an amplifier or amplifier circuit for amplifying the reception signal RX. The ADC 13 may receive the analog input signal IN_A from the AFE circuit 11 and may generate a digital input signal IN_D by converting the analog input signal IN_A. The ADC 13 may have a sample rate and resolution required by the equalization circuit 15 to generate a first data sequence SEQ1.

Herein, the digital input signal IN_D may be simply referred to as an input signal.

In an embodiment, the equalization circuit 15 receives the digital input signal IN_D from the ADC 13, and generates the first data sequence SEQ1 and a first equalized signal EQ1 from the digital input signal IN_D. For example, the equalization circuit 15 may generate the first equalized signal EQ1 by processing the digital input signal IN_D based on parameters provided from the transmitter 5 in channel training, and may determine a symbol value included in the first data sequence SEQ1 based on the level of the first equalized signal EQ1. As will be described later with reference to FIG. 2, the equalization circuit 15 may determine a current symbol value based on adjacent symbol values, and accordingly, when one symbol value is incorrectly determined in the equalization circuit 15 due to noise or the like, the first data sequence SEQ1 may include a plurality of incorrectly determined symbol values. An example of the equalization circuit 15 will be described with reference to FIG. 2.

The partial sequence estimator 17 may receive the first equalized signal EQ1 from the equalization circuit 15, and may generate a second data sequence SEQ2 by processing the first equalized signal EQ1. In an exemplary embodiment, the partial sequence estimator 17 predicts an error of the first data sequence SEQ1 based on the first equalized signal EQ1, and when an error is predicted (i.e., when there is a predicted error), the partial sequence estimator 17 generates the second data sequence SEQ2. The partial sequence estimator 17 may generate the second data sequence SEQ2 by assuming an error of the first data sequence SEQ1, and accordingly, the second data sequence SEQ2 may include a symbol value different from at least one symbol value included in the first data sequence SEQ1. For example, when characteristics of the first sequence data SEQ1 indicate that an error is possible in a symbol of the first sequence data SEQ1, the value of the symbol can be changed a different value to generate the second data sequence SEQ2. For example, the characteristics may include a level of the symbol falling within a certain range that makes it difficult to determine whether the symbol has one of two values. Herein, a symbol value included in the first data sequence SEQ1 may be referred to as a first symbol value, and a symbol value included in the second data sequence SEQ2 may be referred to as a second symbol value.

The partial sequence estimator 17 performs an error detection on the first data sequence SEQ1 based on the first equalized signal EQ1 to detect or attempt to detect an error and generates an error detection signal DET based on a result of the error detection. In some embodiments, the partial sequence estimator 17 generates the second data sequence SEQ2 from a non-equalized signal corresponding to the digital input signal IN_D, and performs the error detection on the first data sequence SEQ1 based on the first equalized signal EQ1 and the non-equalized signal. The partial sequence estimator 170 may generate an activated error detection signal DET when an error of the first data sequence SEQ1 is detected, and may generate an inactivated error detection signal DET when an error of the first data sequence SEQ1 is not detected. In an embodiment, the partial sequence estimator 17 sets the error detection signal DET to a first logical level when detecting the error and sets the error detection signal DET to a second other logic level when not detecting the error. Examples of the partial sequence estimator 18 will be described with reference to FIGS. 4 and 9.

The multiplexer 19 may receive the first data sequence SEQ1 from the equalization circuit 15 and may receive the second data sequence SEQ2 from the partial sequence estimator 17. In addition, the multiplexer 19 may select one of the first data sequence SEQ1 and the second data sequence SEQ2 based on the error detection signal DET received from the partial sequence estimator 17, and may output a selected data sequence as an output data sequence SEQ. For example, the multiplexer 19 may select the first data sequence SEQ1 in response to an inactivated error detection signal DET, and may select the second data sequence SEQ2 in response to an activated error detection signal DET. In an embodiment, the multiplexer 19 outputs the second data sequence SEQ2 when the error detection signal DET is the first level and outputs the first data sequence SEQ1 when the error detection signal DET is the second level. Accordingly, when an error is detected in the first data sequence SEQ1, the second data sequence SEQ2 may be output instead of the first data sequence SEQ1. Herein, the multiplexer 19 may also be referred to as a selection circuit.

As described above, the partial sequence estimator 17 may detect an error which is due to noise generated in the channel CH, and when the error is detected, a second data sequence SEQ2 in which the error is corrected may be output as the output data sequence SEQ. Furthermore, as errors due to noise or the like are detected and corrected, propagation of errors by the equalization circuit 15 may be prevented. As a result, a communication error, for example, a bit error rate (BER), may be reduced. In addition, the partial sequence estimator 17 may predict noise, that is, determine a state in which noise may occur, and costs, such as power and processing time, may be reduced as detection and correction of errors (e.g., generation of the second data sequence SEQ2) are performed only when an error is predicted.

Figure 2:
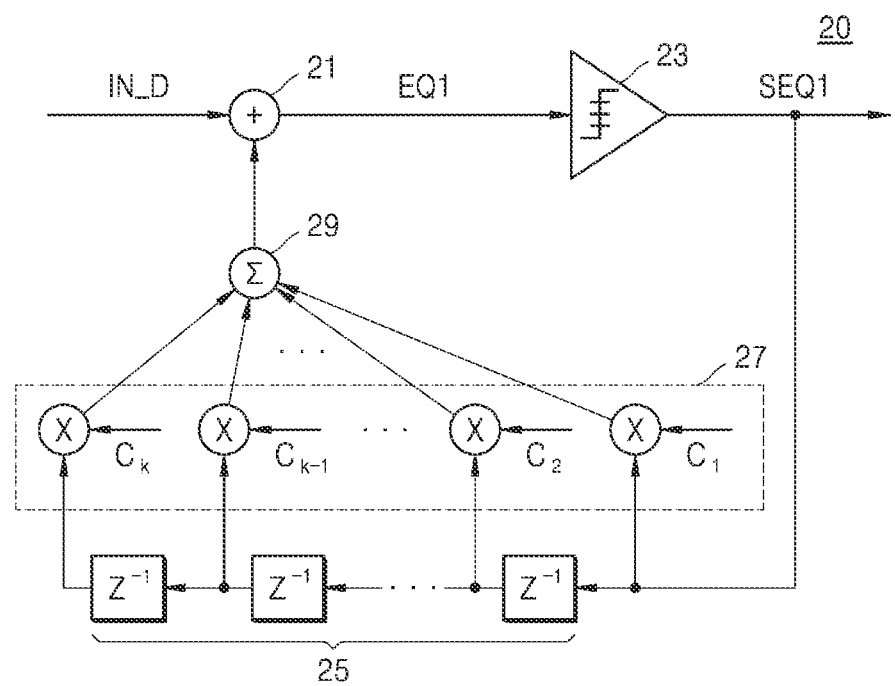
FIG. 2 is a block diagram of an equalization circuit according to an exemplary embodiment of the disclosure.

FIG. 2 is a block diagram of an equalization circuit 20 according to an exemplary embodiment of the disclosure. Specifically, the block diagram of FIG. 2 schematically shows the operation of the equalization circuit 20. As described above with reference to FIG. 1, the equalization circuit 20 generates a first data sequence SEQ1 and a first equalized signal EQ1 from a digital input signal IN_D. Hereinafter, FIG. 2 will be described with reference to FIG. 1.

Referring to FIG. 2, the equalization circuit 20 generates the first data sequence SEQ1 and the first equalized signal EQ1 from the digital input signal IN_D based on a decision feedback equalizer (DFE). As shown in FIG. 2, a symbol value included in the first data sequence SEQ1 may be delayed by a series of delay units 25 (e.g., delay circuits, buffers, etc.), and delayed symbol values may be multiplied by first to kth coefficients C1 to $C_k$, respectively to generate multiplication result values, and the multiplication result values may be summed by a summer 29 (e.g., a summing circuit), where k is an integer greater than 1. In some embodiments, at least one of the first to kth coefficients C1 to $C_k$ may be defined based on parameters provided from the transmitter 5 of FIG. 1 in channel training. An adder 21 (e.g., an adder circuit) may generate the first equalized signal EQ1 by adding the digital input signal IN_D to the output of the summer 29, and a determination portion 23 (e.g., a comparator circuit) may determine a symbol value by comparing the level of the first equalized signal EQ1 with at least one threshold (or threshold level).

As shown in FIG. 2, in the DFE, the current symbol value may be determined based on preceding symbol values, and may be used to determine subsequent symbol values. Accordingly, when an error occurs in one symbol value due to noise or the like, subsequent symbol values may also include errors, and accordingly, errors may propagate in the first data sequence SEQ1. As described above with reference to FIG. 1, the partial sequence estimator 17 may detect an error of the first data sequence SEQ1 and may generate a second data sequence SEQ2 in which the error is corrected. Accordingly, propagation of errors may be prevented, and a BER may be reduced.

Figure 3:
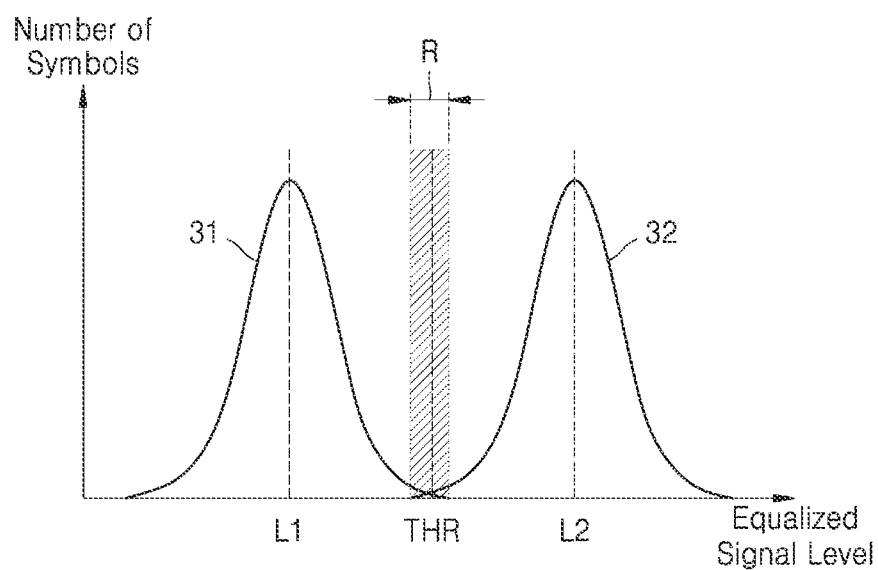
FIG. 3 is a graph showing distributions of symbols according to the level of an equalized signal, according to an exemplary embodiment of the disclosure.

FIG. 3 is a graph showing distributions of symbols according to the level of an equalized signal, according to an example embodiment of the disclosure. Specifically, the graph of FIG. 3 shows a distribution 31 of symbols each having a symbol value of 0 and a distribution 32 of symbols each having a symbol value of 1.

Referring to FIG. 3, symbols each having a symbol value of 0 may be distributed around a first level L1, and symbols each having a symbol value of 1 may be distributed around a second level L2. A threshold THR may be between the first level L1 and the second level L2, and in some embodiments, the threshold THR may be an intermediate value between the first level L1 and the second level L2 (THR=(L1+L2)/2). Accordingly, a symbol corresponding to a level lower than the threshold THR may be determined to have a symbol value of 0, while a symbol corresponding to a level higher than the threshold THR may be determined to have a symbol value of 1. When the equalized signal has a level close to the threshold THR due to noise or the like, there may be a high possibility that an error is included in a determined symbol value. Accordingly, when the level of the first equalized signal EQ1 is in a range R including the threshold THR, the partial sequence estimator 17 of FIG. 1 may determine that there is an error predicted in the first data sequence SEQ1, that is, that the first data sequence SEQ1 includes a potential error.

Figure 4:
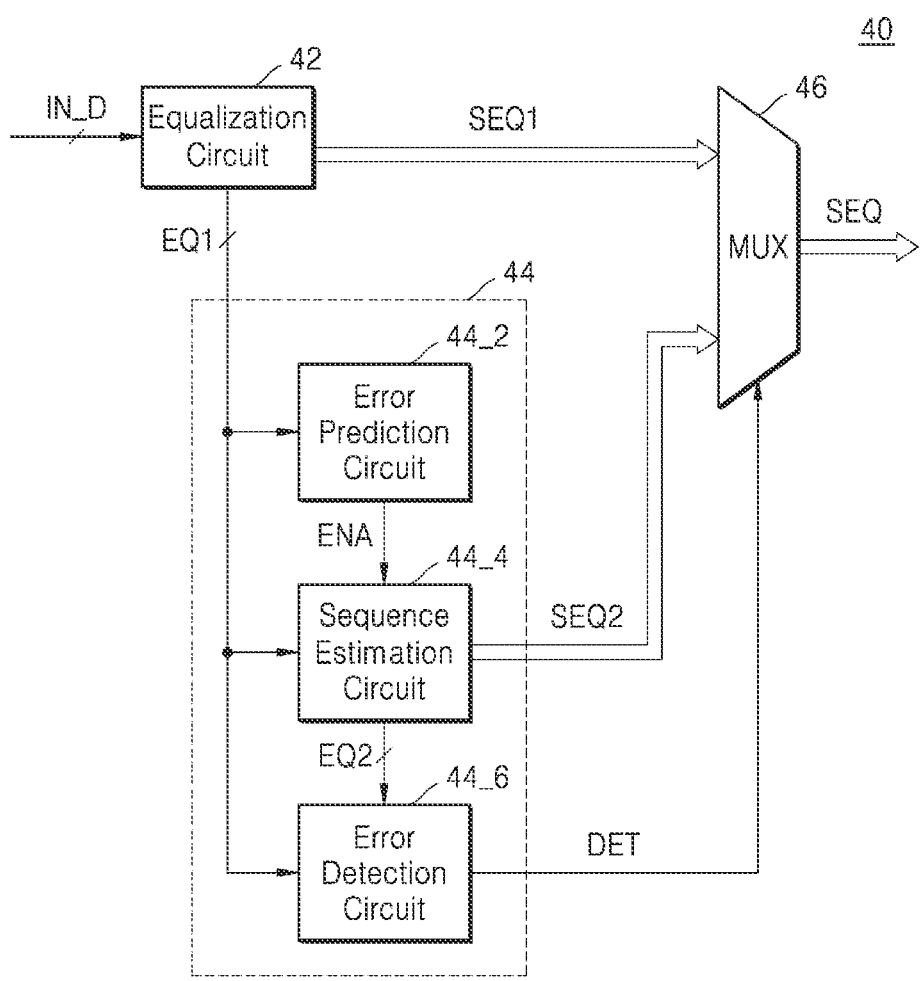
FIG. 4 is a block diagram of a receiver according to an exemplary embodiment of the disclosure.

FIG. 4 is a block diagram of a receiver 40 according to an exemplary embodiment of the disclosure. Similar to the receiver 10 of FIG. 1, the receiver 40 of FIG. 4 may include an equalization circuit 42, a partial sequence estimator 44, and a multiplexer 46. Hereinafter, a description of FIG. 4 that is the same as the description of FIG. 1 will be omitted.

Referring to FIG. 4, the equalization circuit 42 receives a digital input signal IN_D, and generates a first data sequence SEQ1 and a first equalized signal EQ1. In addition, the multiplexer 46 may receive the first data sequence SEQ1 and a second data sequence SEQ2, and may output one of the first data sequence SEQ1 and the second data sequence SEQ2 as an output data sequence SEQ based on an error detection signal DET. The partial sequence estimator 44 may receive the first equalized signal EQ1 and generate the second data sequence SEQ2 and the error detection signal DET. As shown in FIG. 4, the partial sequence estimator 44 includes an error prediction circuit 44_2, a sequence estimation circuit 44_4, and an error detection circuit 44_6.

The error prediction circuit 44_2 receives the first equalized signal EQ1 and generates an enable signal ENA from the first equalized signal EQ1. For example, as described above with reference to FIG. 3, the error prediction circuit 44_2 may predict an error of the first data sequence SEQ1 based on the level of the first equalized signal EQ1, and may generate an activated enable signal ENA (e.g., a first logic level) when an error is predicted. The enable signal ENA may be inactivated or deactivated (e.g., a second other logic level) when no error is predicted. In some embodiments, the error prediction circuit 44_2 activates the enable signal ENA for a period corresponding to n symbols from a time point when an error is predicted, where n is an integer greater than 1. An example of the error prediction circuit 44_2 will be described with reference to FIG. 6.

The sequence estimation circuit 44_4 receives the first equalized signal EQ1 and the enable signal ENA, and generates the second data sequence SEQ2 and a second equalized signal EQ2 from the first equalized signal EQ1 and the enable signal ENA. The sequence estimation circuit 44_4 may assume an error of the first data sequence SEQ1, and thus may generate a second data sequence SEQ2 including at least one symbol value different from at least one symbol value of the first data sequence SEQ1. The sequence estimation circuit 44_4 may determine a symbol value based on the level of the second equalized signal EQ2, and the second data sequence SEQ2 may include determined symbol values. In an embodiment, the sequence estimation circuit 44_4 generates the second data sequence SEQ2 and the second equalized signal EQ2 in response to an activated enable signal ENA, and may be set to a low power mode in response to an inactivated enable signal ENA. Accordingly, power consumption by the sequence estimation circuit 44_4 in the receiver 40 may be reduced. An example of the sequence estimation circuit 44_4 will be described with reference to FIG. 7.

The error detection circuit 44_6 receives the first equalized signal EQ1 and the second equalized signal EQ2 and generates the error detection signal DET based on the first equalized signal EQ1 and the second equalized signal EQ2. In some embodiments, the error detection circuit 44_6 generates the error detection signal DET based on maximum likelihood sequence estimation (MLSE). The MLSE may refer to finding a candidate point nearest to a point indicated by n levels respectively corresponding to n consecutive symbols from among candidate points corresponding to combinations of symbol values that the n consecutive symbols have in an n-dimensional signal constellation. In an embodiment, the error detection circuit 44_6 calculates a first Euclidian distance (e.g., D1 in FIG. 10A) corresponding to the first equalized signal EQ1 and a second Euclidean distance (e.g., D2 in FIG. 10A) corresponding to the second equalized signal EQ2, and may detect an error based on a result of comparing the first Euclidean distance to the second Euclidean distance.

The error detection circuit 44_6 may receive the enable signal ENA from the error prediction circuit 44_2. In an embodiment, the error detection circuit 44_6 generates, in response to an activated enable signal ENA, an error detection signal DET which is activated or inactivated according to whether or not an error is detected, and generates, in response to an inactivated enable signal ENA, an error detection signal DET that is inactivated. Accordingly, when the enable signal ENA is inactivated, that is, when an error is not predicted in the first data sequence SEQ1, the multiplexer 46 may output the first data sequence SEQ1 as the output data sequence SEQ. In some embodiments, the error detection circuit 44_6 is set to a low power mode in response to an inactivated enable signal ENA, and generates an inactivated error detection signal DET in the low power mode. The error detection circuit 44_6 may be set to a normal power mode in response to an activated enable signal ENA. Accordingly, in the receiver 40, power consumption by the error detection circuit 44_6 as well as the sequence estimation circuit 44_4 may be reduced. Examples of the error detection circuit 44_6 will be described with reference to FIGS. 10A and 10B.

Figure 5:
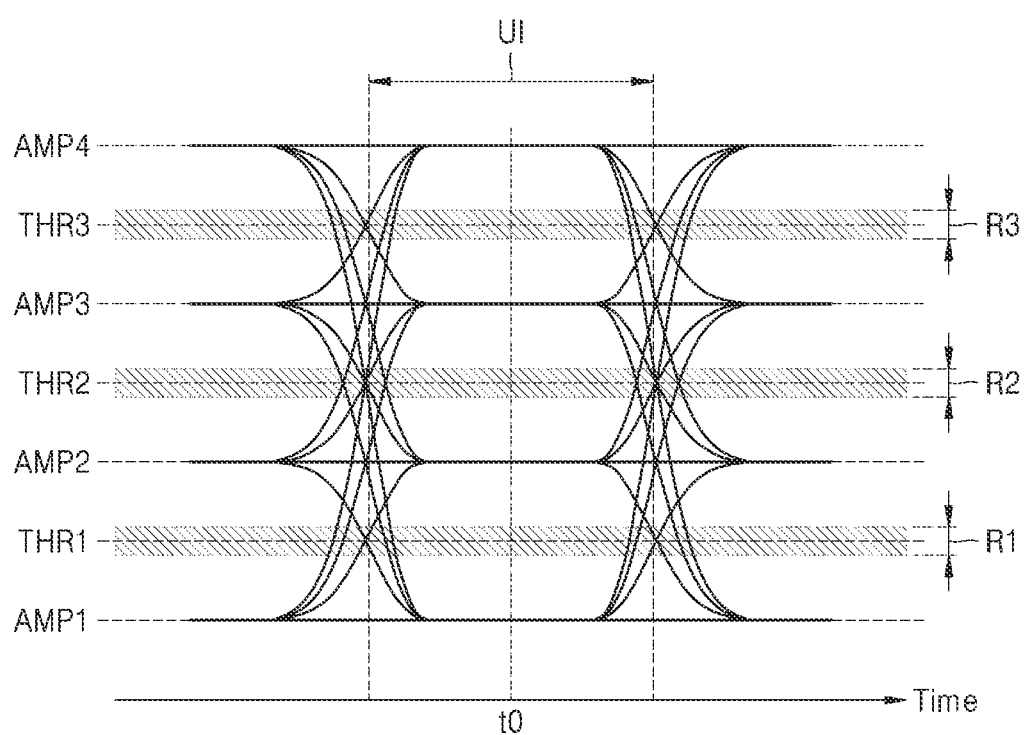
FIG. 5 is a view illustrating examples of a symbol according to an exemplary embodiment of the disclosure.

FIG. 5 is a view illustrating examples of a symbol according to an exemplary embodiment of the disclosure. Specifically, FIG. 5 shows examples of a symbol modulated by 4-level pulse amplitude modulation (PAM-4). In some embodiments, the vertical axis of FIG. 5 may be a voltage.

A symbol may have a level corresponding to a symbol value in a unit interval UI. For example, as shown in FIG. 5, the symbol may have first to fourth amplitudes AMP1 to AMP4 in the unit interval UI, and the first to fourth amplitudes AMP1 to AMP4 may correspond to four different symbol values (e.g., binary numbers "00", "01", "10", and "11"). As shown in FIG. 5, the unit interval UI may include an interval in which a level varies, that is, a rise time and a falling time, and the ADC of FIG. 1 may generate a digital input signal IN_D by sampling the symbol at the center of the unit interval UI, that is, at time t0.

First to third thresholds THR1 to THR3 may be used to determine the amplitude of the symbol. For example, as shown in FIG. 5, the first threshold THR1 may be used to distinguish between the first amplitude AMP1 and the second amplitude AMP2, and in some embodiments, the first threshold THR1 may correspond to an intermediate value between the first amplitude AMP1 and the second amplitude AMP2. In addition, the second threshold THR2 may be used to distinguish between the second amplitude AMP2 and the third amplitude AMP3, and in some embodiments, the second threshold THR2 may correspond to an intermediate value between the second amplitude AMP2 and the third amplitude AMP3. In addition, the third threshold THR3 may be used to distinguish between the third amplitude AMP3 and the fourth amplitude AMP4, and in some embodiments, the third threshold THR3 may correspond to an intermediate value between the third amplitude AMP3 and the fourth amplitude AMP4.

Although FIG. 5 shows examples of an ideal symbol, a symbol included in the reception signal RX may be affected by the channel CH and/or adjacent symbols, and thus may have an amplitude different from the first to fourth amplitudes AMP1 to AMP4 at time t0. As described above with reference to FIG. 3, when a symbol has an amplitude close to one of the first to third thresholds THR1 to THR3, a determined symbol value may have a high probability of including an error. According to an exemplary embodiment of the disclosure, the error prediction circuit 44_2 of FIG. 4 defines first to third ranges R1 to R3 respectively including the first to third thresholds THR1 to THR3, as shown in FIG. 5. In addition, when the level of the first equalized signal EQ1 is in one of the first to third ranges R1 to R3, the error prediction circuit 44_2 determines that there is a potential error. Hereinafter, although PAM-4 will be mainly referred to as shown in FIG. 5, exemplary embodiments of the disclosure are not limited thereto.

Figure 6:
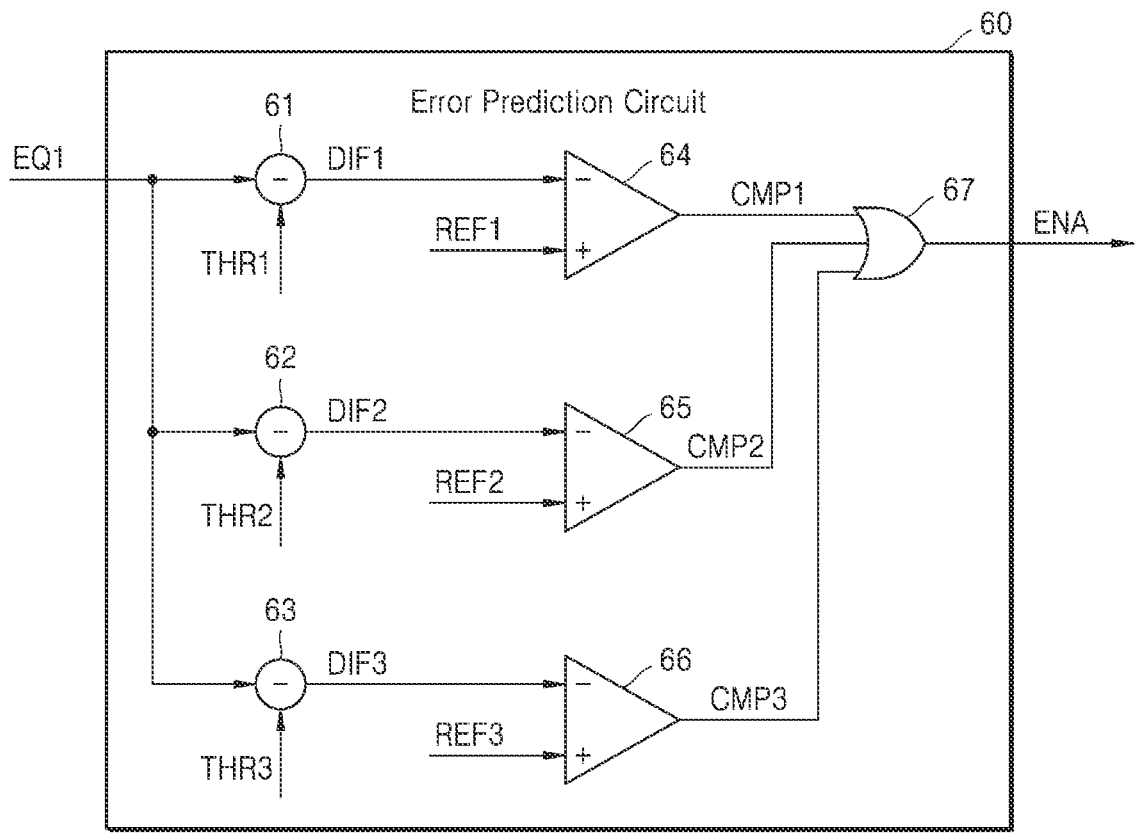
FIG. 6 is a block diagram of an error prediction circuit according to an exemplary embodiment of the disclosure.

FIG. 6 is a block diagram of an error prediction circuit 60 according to an exemplary embodiment of the disclosure. The error prediction circuit 44_2 of FIG. 4 may be implemented using the error prediction circuit 60. Specifically, the block diagram of FIG. 6 shows an error prediction circuit 60 for predicting an error in a symbol modulated based on PAM-4. As described above with reference to FIG. 4, the error prediction circuit 60 may predict an error based on a first equalized signal EQ1, and may generate an activated enable signal ENA when there is a predicted error. As shown in FIG. 6, the error prediction circuit 60 includes first to third calculators 61 to 63 (e.g., subtractors or subtractor circuits), first to third comparators 64 to 66 (e.g., comparison circuits), and a 3-input OR gate 67.

In an embodiment, the error prediction circuit 60 calculates a difference between the level of the first equalized signal EQ1 and a threshold. For example, as shown in FIG. 6, the first calculator 61 may calculate a first difference DIF1 between the first equalized signal EQ1 and a first threshold THR1, the second calculator 62 may calculate a second difference DIF2 between the first equalized signal EQ1 and a second threshold TRH2, and the third calculator 63 may calculate a third difference DIF3 between the first equalized signal EQ1 and a third threshold THR3.

In an embodiment, the error prediction circuit 60 compares a difference between the level of the first equalized signal EQ1 and a threshold with a reference value, and generates an activated enable signal ENA when the difference is less than the reference value. For example, as shown in FIG. 6, the first comparator 64 compares the first difference DIF1 with a first reference value REF1. When the first difference DIF1 is less than the first reference value REF1, that is, when the level of the first equalized signal EQ1 is in the first range R1, the first comparator 64 may generate a first comparison signal CMP1 having a high level. The second comparator 65 compares the second difference DIF2 with a second reference value REF2. When the second difference DIF2 is less than the second reference value REF2, that is, when the level of the first equalized signal EQ1 is in the second range R2, the second comparator 65 may generate a second comparison signal CMP2 having a high level. The third comparator 66 compares the third difference DIF3 with a third reference value REF3. When the third difference DIF3 is less than the third reference value REF3, that is, when the level of the first equalized signal EQ1 is in the third range R3, the third comparator 66 may generate a third comparison signal CMP3 having a high level. When one of the first to third comparison signals CMP1 to CMP3 has a high level, that is, when the level of the first equalized signal EQ1 is in one of the first to third ranges R1 to R3, the 3-input OR gate 67 may generate an enable signal ENA having a high level.

The error prediction circuit 44_2 of FIG. 4 is not limited to the error prediction circuit 60 of FIG. 6, and may have any structure for generating an enable signal ENA from the first equalized signal EQ1. For example, the error prediction circuit 44_2 may include a smaller number of calculators and/or comparators than the number of calculators and/or comparators shown in FIG. 6, and may sequentially perform some of the operations performed in parallel in FIG. 6.

Figure 7:
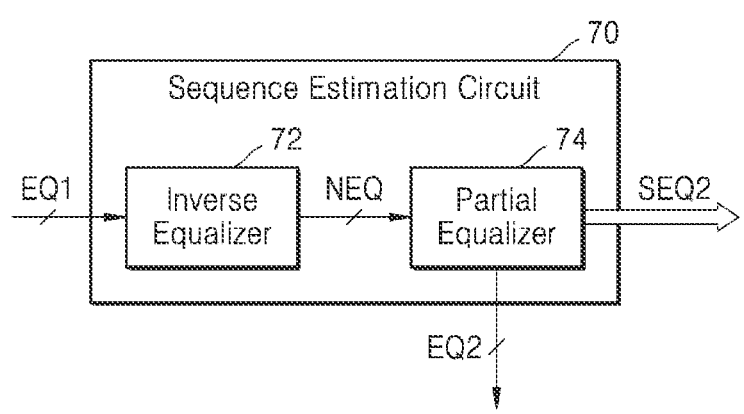
FIG. 7 is a block diagram of a sequence estimation circuit according to an exemplary embodiment of the disclosure.

FIG. 7 is a block diagram of a sequence estimation circuit 70 according to an exemplary embodiment of the disclosure. The sequence estimation circuit 44_4 of FIG. 4 may be implemented by the sequence estimation circuit 70. As described above with reference to FIG. 4, the sequence estimation circuit 70 may receive a first equalized signal EQ1 and generate a second data sequence SEQ2 and a second equalized signal EQ2. As shown in FIG. 7, the sequence estimation circuit 70 includes an inverse equalizer 72 (e.g., a circuit) and a partial equalizer 74 (e.g., a circuit). Hereinafter, FIG. 7 will be described with reference to FIG. 4.

The inverse equalizer 72 receives the first equalized signal EQ1 and generates a non-equalized signal NEQ from the first equalized signal EQ1. An error of the first data sequence SEQ1 may be predicted using a signal that is not equalized by the equalization circuit 42, that is, the non-equalized signal NEQ corresponding to the digital input signal IN_D. The inverse equalizer 72 may generate the non-equalized signal NEQ by inversely performing an operation performed by the equalization circuit 42. For example, when the equalization circuit 42 generates the first equalized signal EQ1 based on a DFE as described above with reference to FIG. 2, the inverse equalizer 72 may generate the non-equalized signal NEQ by inversely applying the operation of the equalization circuit 20 shown in FIG. 2 to the first equalized signal EQ1. The inverse equalizer 72 may be referred to as a DFE canceller.

The partial equalizer 74 receives the non-equalized signal NEQ and generates the second data sequence SEQ2 and the second equalized signal EQ2 from the non-equalized signal NEQ. The partial equalizer 74 may have a structure similar to that of the equalization circuit 42, and may set a symbol value different from a symbol value with a predicted error in the first data sequence SEQ1. For example, when the level of a symbol in the first data sequence SEQ1 is in the first range R1 of FIG. 5 and the first equalization circuit 42 determines a symbol value corresponding to the symbol as a symbol value (e.g., "00") corresponding to the first amplitude AMP1, the partial equalizer 74 may set the symbol value corresponding to the symbol to a symbol value (e.g., "01") corresponding to another amplitude adjacent to the first range R1, that is, the second amplitude AMP2. In some embodiments, the partial equalizer 74 receives the first data sequence SEQ1 from the equalization circuit 42 and identifies a symbol value with a predicted error in the first data sequence SEQ1.

The partial equalizer 74 may generate the second equalized signal EQ2 in the same manner as the equalization circuit 42 from a set symbol value of the second data sequence SEQ2 and the non-equalized signal NEQ. Also, the partial equalizer 74 may sequentially determine symbol values subsequent to the set symbol value based on levels of the second equalized signal EQ2 in the same manner as the equalization circuit 42, and accordingly, the second data sequence SEQ2 may be generated. As a result, the second data sequence SEQ2 may include at least one symbol value different from at least one symbol value of the first data sequence SEQ1.

Figure 8:
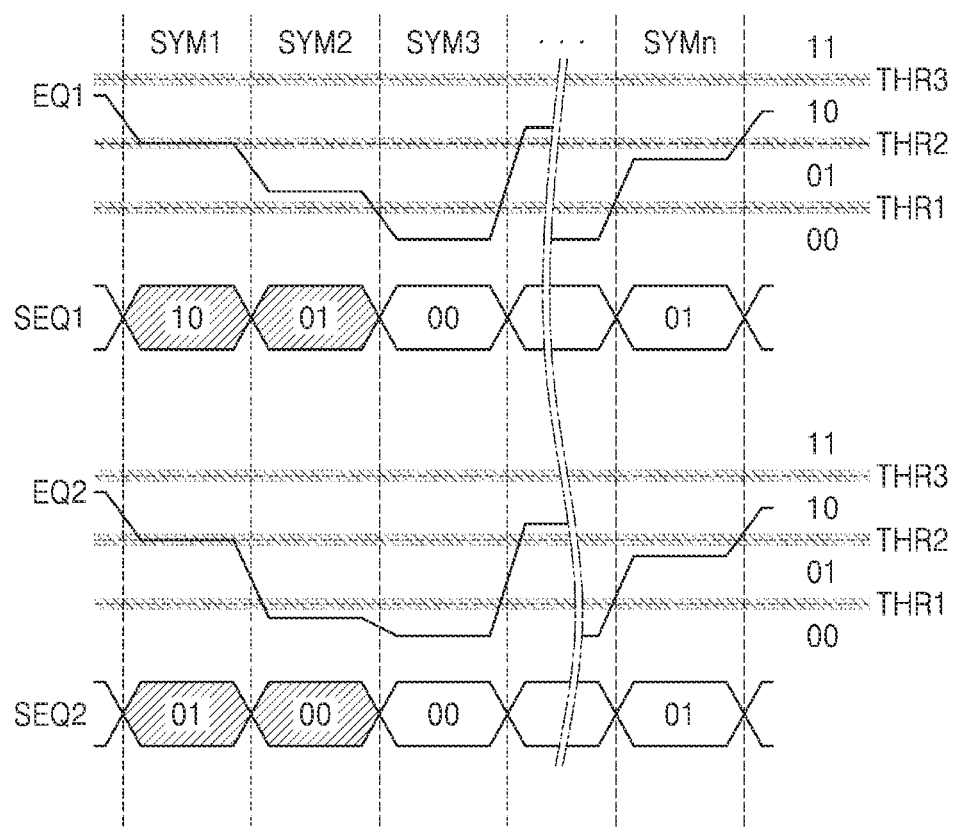
FIG. 8 is a timing diagram illustrating an example of an operation of a sequence estimation circuit, according to an exemplary embodiment of the disclosure.

FIG. 8 is a timing diagram illustrating an example of an operation of a sequence estimation circuit, according to an exemplary embodiment of the disclosure. Specifically, the timing diagram of FIG. 8 shows a first equalized signal EQ1, a first data sequence SEQ1, a second equalized signal EQ2, and a second data sequence SEQ2 over time. In FIG. 8, the first equalized signal EQ1 and the second equalized signal EQ2 are shown together with first to third thresholds THR1 to THR3, and are shown as levels represented by digital values. In the following description, FIG. 8 will be described with reference to FIG. 4.

In a first symbol SYM1, the first equalized signal EQ1 may have a level close to the second threshold THR2 due to noise or the like. As shown in FIG. 8, the equalization circuit 42 determines the symbol value of the first symbol SYM1 as "10". Due to the level of the first equalized signal EQ1 being close to the second threshold THR2, the error prediction circuit 44_2 generates an activated enable signal ENA, and the sequence estimation circuit 44_4 generates the second equalized signal EQ2 and the second data sequence SEQ2. As shown in FIG. 8, the sequence estimation circuit 44_4 sets the symbol value of the first symbol SYM1 to "01" adjacent to the symbol value "10" of the first data sequence SEQ1.

In a second symbol SYM2, the first equalized signal EQ1 has a level between the first threshold THR1 and the second threshold THR2, and accordingly, the equalization circuit 42 determines the symbol value of the second symbol SYM2 as "01". On the other hand, the second equalized signal EQ2 has a level lower than the first threshold THR1 due to the first symbol SYM1 set to "01" in the second data sequence SEQ2, and accordingly, the sequence estimation circuit 44_4 determines the symbol value of the second symbol SYM2 as "00".

In a third symbol SYM3, the first equalized signal EQ1 and the second equalized signal EQ2 each have a level less than the first threshold THR1, and accordingly, the symbol value of the third symbol SYM3 is determined to be "00" in both the first data sequence SEQ1 and the second data sequence SEQ2. In addition, in an nth symbol SYMn, the first equalized signal EQ1 and the second equalized signal EQ2 each have a level between the second threshold THR2 and the third threshold THR3, and accordingly, the symbol value of the nth symbol SYMn is determined to be "10" in both the first data sequence SEQ1 and the second data sequence SEQ2.

As shown in FIG. 8, the first data sequence SEQ1 and the second data sequence SEQ2 each have different symbol values in the first symbol SYM1 and the second symbol SYM2. As described above with reference to FIG. 4, when an error of the first data sequence SEQ1 is detected by the error detection circuit 44_6, the second data sequence SEQ2 may be selected, while, when an error of the first data sequence SEQ1 is not detected by the error detection circuit 44_6, the first data sequence SEQ1 may be selected.

Figure 9:
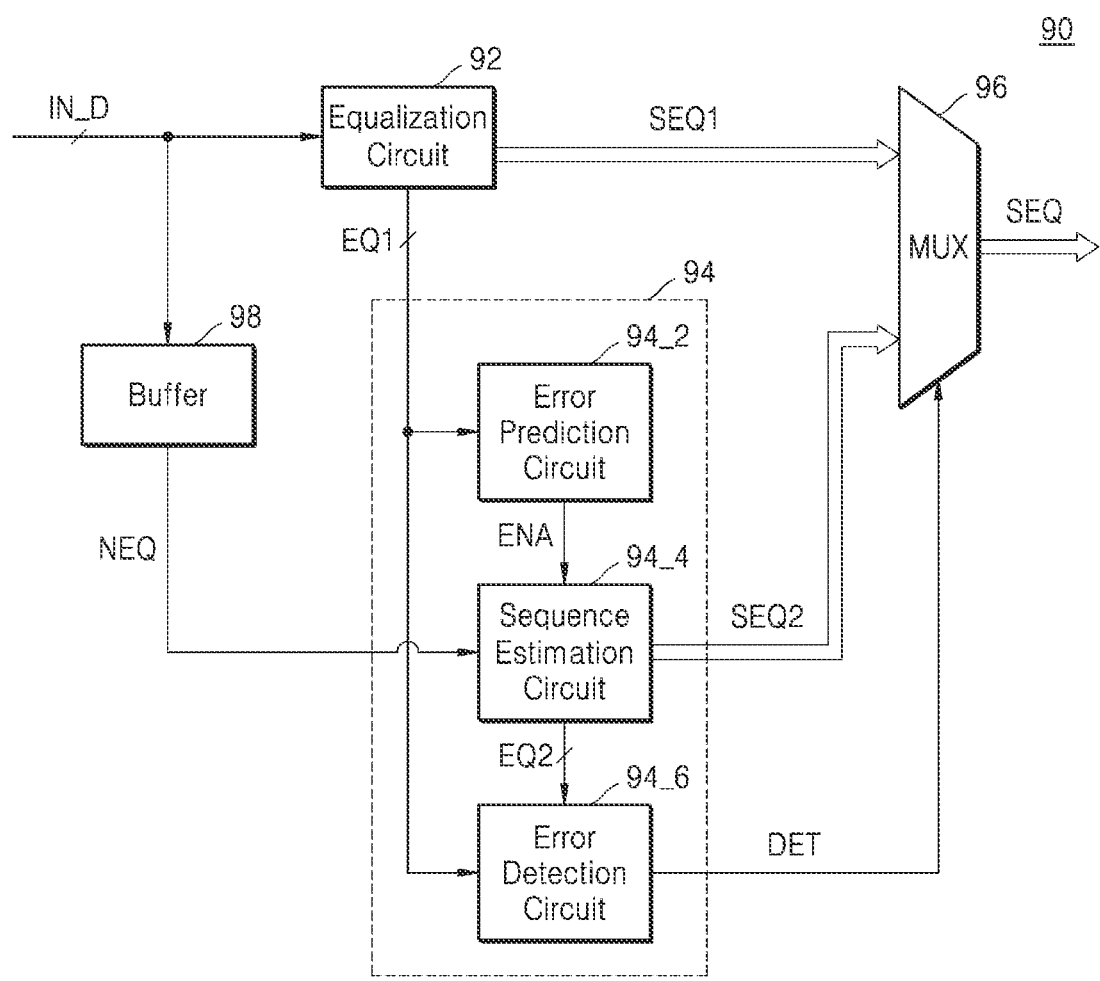
FIG. 9 is a block diagram of a receiver according to an exemplary embodiment of the disclosure.

FIG. 9 is a block diagram of a receiver 90 according to an exemplary embodiment of the disclosure. The receiver 90 includes an equalization circuit 92, a partial sequence estimator 94, and a multiplexer 96, similar to the receiver 40 of FIG. 4, and furthers include a buffer 98 (e.g., a buffer circuit). Hereinafter, a description of FIG. 9 that is the same as the description of FIGS. 1 and 4 will be omitted.

Referring to FIG. 9, the equalization circuit 92 receives a digital input signal IN_D, and generates a first data sequence SEQ1 and a first equalized signal EQ1 from the digital input signal IN_D. In addition, the multiplexer 96 receives the first data sequence SEQ1 and a second data sequence SEQ2, and outputs one of the first data sequence SEQ1 and the second data sequence SEQ2 as an output data sequence SEQ based on an error detection signal DET. The partial sequence estimator 94 receives the first equalized signal EQ1 and generates the second data sequence SEQ2 and the error detection signal DET based on the first equalized signal EQ1. As shown in FIG. 9, the partial sequence estimator 94 includes an error prediction circuit 94_2, a sequence estimation circuit 94_4, and an error detection circuit 94_6.

Compared with the partial sequence estimator 44 of FIG. 4, the sequence estimation circuit 94_4 in the partial sequence estimator 94 of FIG. 9 receives a non-equalized signal NEQ from the buffer 98 instead of receiving the first equalized signal EQ1. As shown in FIG. 9, the buffer 98 receives a digital input signal IN_D and stores the digital input signal IN_D. For example, the buffer 98 may function as a first in first out (FIFO), and may store values of the digital input signal IN_D required for the sequence estimation circuit 94_4 to generate the second data sequence SEQ2 and a second equalized signal EQ2. In some embodiments, the buffer 98 may include a memory device including a memory cell array, or may include a plurality of registers. Herein, storing the value of the digital input signal IN_D in the buffer 98 may be referred to as storing the digital input signal IN_D. The sequence estimation circuit 94_4 generates the second data sequence SEQ2 and the second equalized signal EQ2 from the non-equalized signal NEQ provided from the buffer 98, and accordingly, in the sequence estimation circuit 94_4, the inverse equalizer 72 of FIG. 7 may be omitted.

Figure 10A:
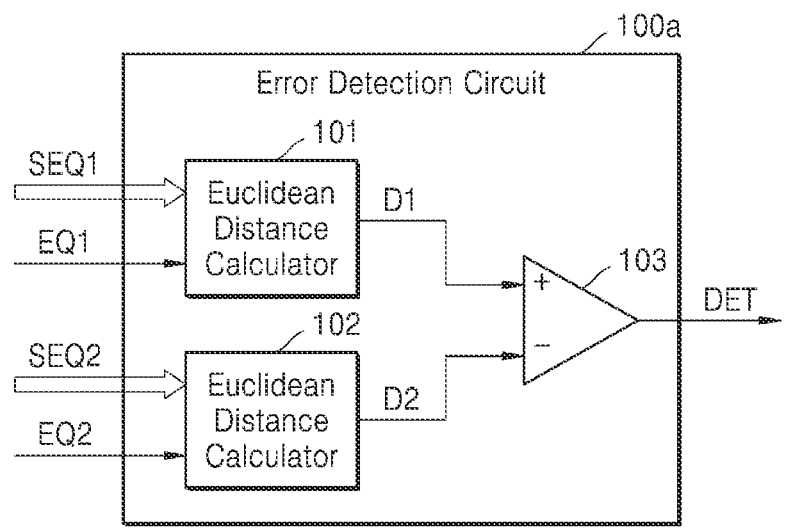
FIGS. 10A and 10B are block diagrams of error detection circuits according to an exemplary embodiment of the disclosure.
Figure 10B:
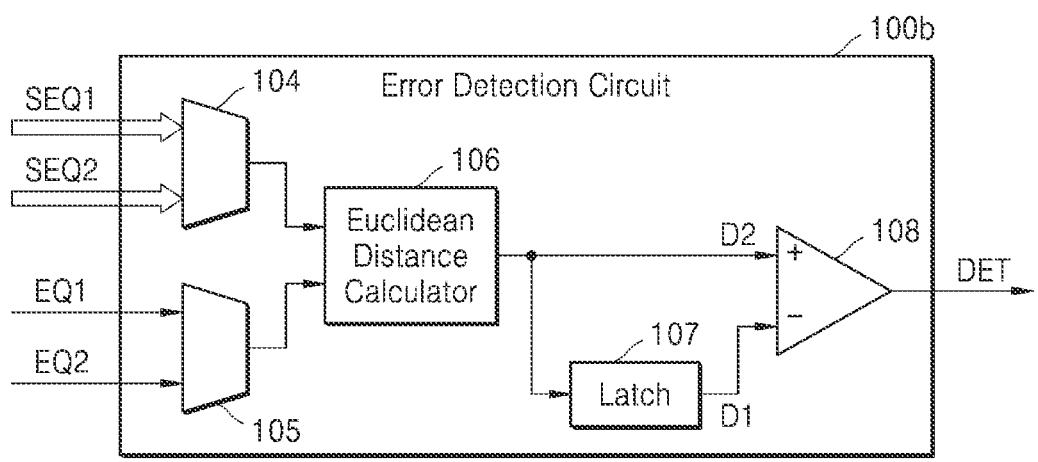

FIGS. 10A and 10B are block diagrams of error detection circuits 100a and 100b according to exemplary embodiments of the disclosure. The error detection circuits 44_6 or 94_6 may be implemented by the error detection circuit 100a or the error detection circuit 100b. As described above with reference to FIG. 4, the error detection circuits 100a and 100b of FIGS. 10A and 10B may detect an error of the first data sequence SEQ1 based on MLSE, and may generate an error detection signal DET based on the detected error. Hereinafter, overlapping descriptions in relation to FIGS. 10A and 10B will be omitted.

Referring to FIG. 10A, the error detection circuit 100a includes a first Euclidean distance calculator 101, a second Euclidean distance calculator 102 and a comparator 103. The first Euclidean distance calculator 101 calculates a first Euclidean distance D1 based on the first data sequence SEQ1 and the first equalized signal EQ1. For example, the first Euclidean distance calculator 101 may extract n levels of the first equalized signal EQ1 and n symbol values included in the first data sequence SEQ1, the n levels and n symbol values corresponding to n consecutive symbols. In addition, the first Euclidean distance calculator 101 calculates, as a first Euclidean distance D1, a Euclidean distance between a point defined by the n levels and a point defined by the n symbol values in an n-dimensional signal constellation. Also, the second Euclidean distance calculator 102 calculates a second Euclidean distance D2 based on the second data sequence SEQ2 and the second equalized signal EQ2. For example, the second Euclidean distance calculator 102 may extract n levels of the second equalized signal EQ2 and n symbol values included in the second data sequence SEQ2, the n levels and n symbol values corresponding to n consecutive symbols. In addition, the second Euclidean distance calculator 102 calculates, as a second Euclidean distance D2, a Euclidean distance between a point defined by the n levels and a point defined by the n symbol values in an n-dimensional signal constellation.

The comparator 103 compares the first Euclidean distance D1 with the second Euclidean distance D2 and generate an error detection signal DET based on a result of the comparison. As shown in FIG. 10A, when the first Euclidean distance D1 is greater than the second Euclidean distance D2, the comparator 103 generates an activated error detection signal DET, which indicates that an error in the first data sequence SEQ1 has been detected (e.g., an actual error rather than a possible error). When the first Euclidean distance D1 is not greater than the second Euclidean distance D2, the comparator 103 generates an inactivated error detection signal DET.

Referring to FIG. 10B, the error detection circuit 100b includes a first multiplexer 104, a second multiplexer 105, a Euclidean distance calculator 106, a latch 107, and a comparator 108. Compared with the error detection circuit 100a of FIG. 10A, the error detection circuit 100b of FIG. 10B includes only one Euclidean distance calculator 106 and sequentially calculates the first Euclidean distance D1 and the second Euclidean distance D2 instead of calculating them in parallel. That is, because the first data sequence SEQ1 and the second equalized signal EQ1 may be generated early by the equalization circuit 42 of FIG. 4, while generations of the second data sequence SEQ2 and the second equalized signal EQ2 may be delayed by the sequence estimation circuit 44_4. The error detection circuit 100b sequentially calculates the first Euclidean distance D1 and the second Euclidean distance D2 by using one Euclidean distance calculator 106.

The first multiplexer 104 sequentially selects the first data sequence SEQ1 and the second data sequence SEQ2 and provides them in turn to the Euclidean distance calculator 106. The second multiplexer 105 sequentially selects the first equalized signal EQ1 and the second equalized signal EQ2 and provides them in turn to the Euclidean distance calculator 106. The Euclidean distance calculator 106 sequentially calculates the first Euclidean distance D1 and the second Euclidean distance D2. The latch 107 stores the first Euclidean distance D1 output from the Euclidean distance calculator 106, and provides the first Euclidean distance D1 to the comparator 108. The comparator 108 may generate an error detection signal DET by comparing the first Euclidean distance D1 provided from the latch 107 with the second Euclidean distance D2 received from the Euclidean distance calculator 106.

Figure 11:
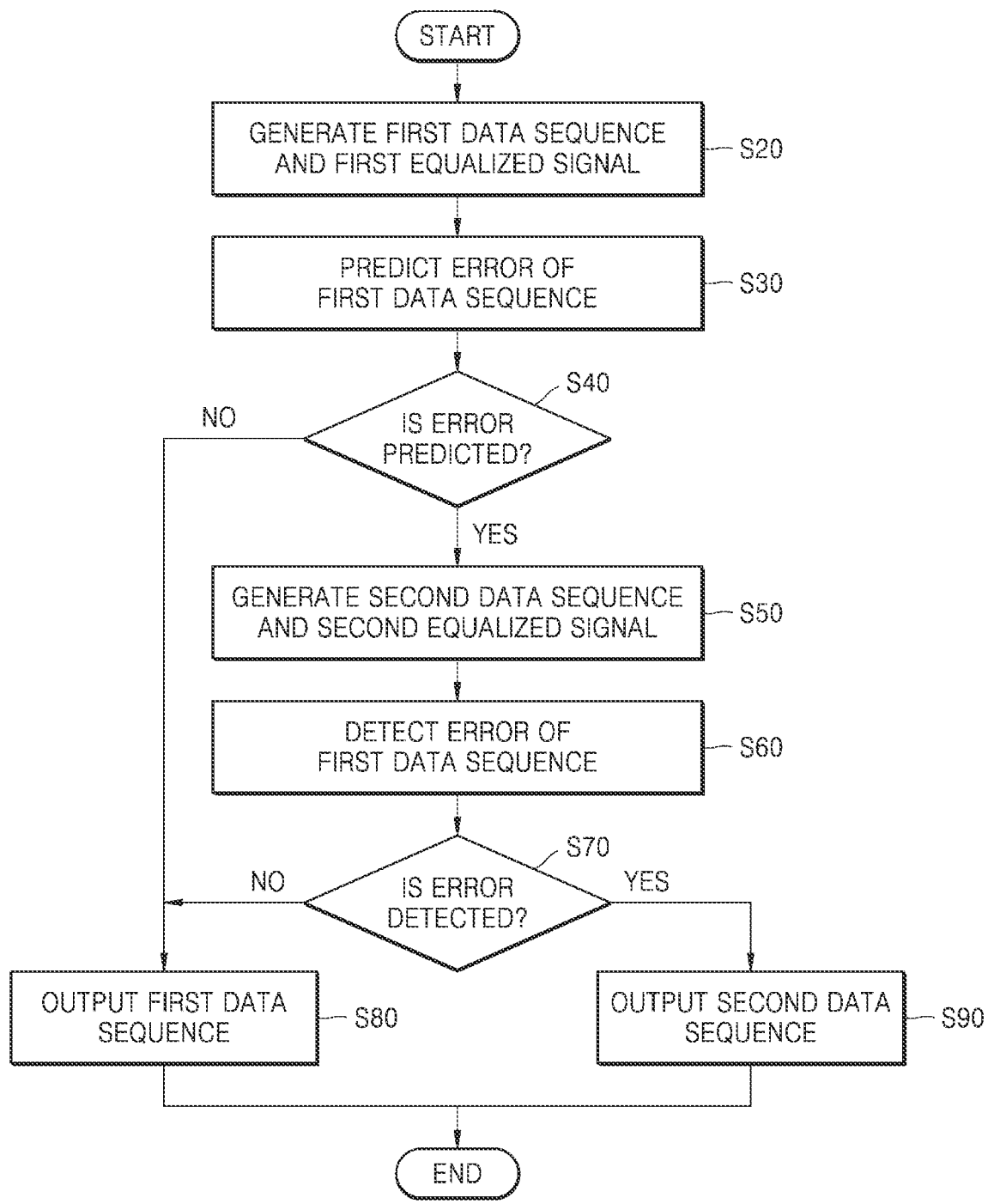
FIG. 11 is a flowchart of a method for performing channel equalization based on error detection, according to an exemplary embodiment of the disclosure.

FIG. 11 is a flowchart of a method for performing channel equalization based on error detection, according to an exemplary embodiment of the disclosure. The method for performing channel equalization based on error detection may be referred to as a method of processing an input signal including a series of symbols, and may include a plurality of operations S20, S30, S40, S50, S60, S70, S80, and S90, as shown in FIG. 11. In some embodiments, the method of FIG. 11 may be performed by the receiver 10 of FIG. 1, and FIG. 11 will be described with reference to FIG. 1.

Referring to FIG. 11, in operation S20, a first data sequence SEQ1 and a first equalized signal EQ1 are generated. For example, the equalization circuit 15 may generate the first data sequence SEQ1 and the first equalized signal EQ1 from a digital input signal IN_D based on a DFE.

In operation S30, an error prediction is performed to predict an error of the first data sequence SEQ1. For example, when the level of the first equalized signal EQ1 is close to a threshold, the partial sequence estimator 17 may determine that an error is predicted in the first data sequence SEQ1, that is, that the first data sequence SEQ1 has a potential error. An example of operation S30 will be described later with reference to FIG. 12. As shown in FIG. 11, in operation S40, when an error is predicted, operation S50 is subsequently performed, while, when an error is not predicted, operation S80 is subsequently performed.

When an error is predicted in the first data sequence SEQ1, a second data sequence SEQ2 and a second equalized signal EQ2 are generated in operation S50. For example, the partial sequence estimator 17 may generate the second data sequence SEQ2 and the second equalized signal EQ2 from a non-equalized signal corresponding to the digital input signal IN_D by assuming an error of the first data sequence SEQ1. Examples of operation S50 will be described later with reference to FIGS. 13A and 13B.

In operation S60, an error detection is performed to detect an error of the first data sequence SEQ1. For example, the partial sequence estimator 17 may detect an error of the first data sequence SEQ1 based on MLSE. An example of operation S60 will be described later with reference to FIG. 14. As shown in FIG. 11, in operation S70, when an error is not detected in the first data sequence SEQ1, operation S80 is subsequently performed, while, when an error is detected in the first data sequence SEQ1, operation S90 is subsequently performed.

When an error is not predicted or detected in the first data sequence SEQ1, the first data sequence SEQ1 is output in operation S80. For example, the partial sequence estimator 17 may generate an inactivated error detection signal DET when an error is not predicted in the first data sequence SEQ1 or when an error is predicted but not detected, and the multiplexer 19 may output the first data sequence SEQ1 as an output data sequence SEQ in response to the inactivated error detection signal DET.

When an error is detected in the first data sequence SEQ1, the second data sequence SEQ2 is output in operation S90. For example, when an error is detected in the first data sequence SEQ1, the partial sequence estimator 17 may generate an activated error detection signal DET, and the multiplexer 19 may output the second data sequence SEQ2 as the output data sequence SEQ in response to the activated error detection signal DET. Accordingly, a second data sequence SEQ2 generated by assuming an error of the first data sequence SEQ1 may be output.

Figure 12:
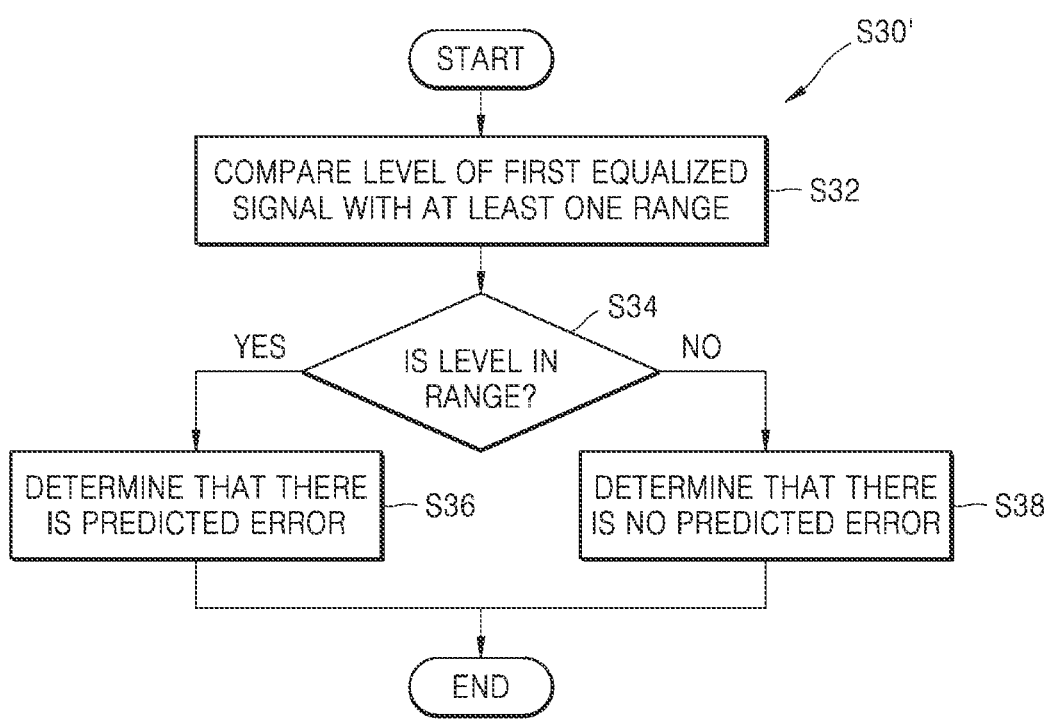
FIG. 12 is a flowchart of a method for performing channel equalization based on error detection, according to an exemplary embodiment of the disclosure.

FIG. 12 is a flowchart of a method for performing channel equalization based on error detection, according to an exemplary embodiment of the disclosure. Specifically, the flowchart of FIG. 12 shows an example of operation S30 of FIG. 11. As described above with reference to FIG. 11, an error of the first data sequence SEQ1 may be predicted in operation S30' of FIG. 12. As shown in FIG. 12, operation S30' may include a plurality of operations S32, S34, S36, and S38. In some embodiments, operation S30' may be performed by the error prediction circuit 44_2 of FIG. 4, and FIG. 12 will be described below with reference to FIG. 4.

Referring to FIG. 12, in operation S32, the level of the first equalized signal EQ1 is compared with at least one range or a plurality of ranges. For example, the error prediction circuit 44_2 may define at least one range including at least one threshold used to determine a symbol value, and may compare the level of the first equalized signal EQ1 with the at least one range. As shown in FIG. 12, in operation S34, when the level of the first equalized signal EQ1 is in the at least one range, operation S36 is subsequently performed, while, when the level of the first equalized signal EQ1 is not in the at least one range, operation S38 is subsequently performed.

When the level of the first equalized signal EQ1 is in the at least one range, it may be determined in operation S36 that an error is predicted, that is, there is a predicted error. For example, when an error is predicted, the error prediction circuit 44_2 may generate an activated enable signal ENA. On the other hand, when the level of the first equalized signal EQ1 is not in the at least one range, it may be determined in operation S38 that an error is not predicted, that is, there is no predicted error. For example, when an error is not predicted, the error prediction circuit 44_2 may generate an inactivated enable signal ENA.

Figure 13A:
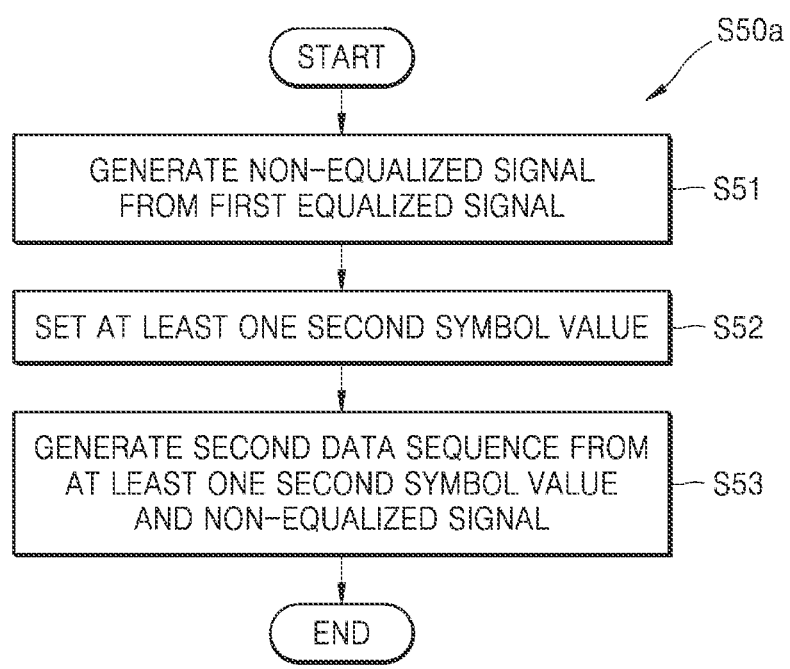
FIGS. 13A and 13B are flowcharts illustrating examples of a method for performing channel equalization based on error detection, according to exemplary embodiment of the disclosure.
Figure 13B:
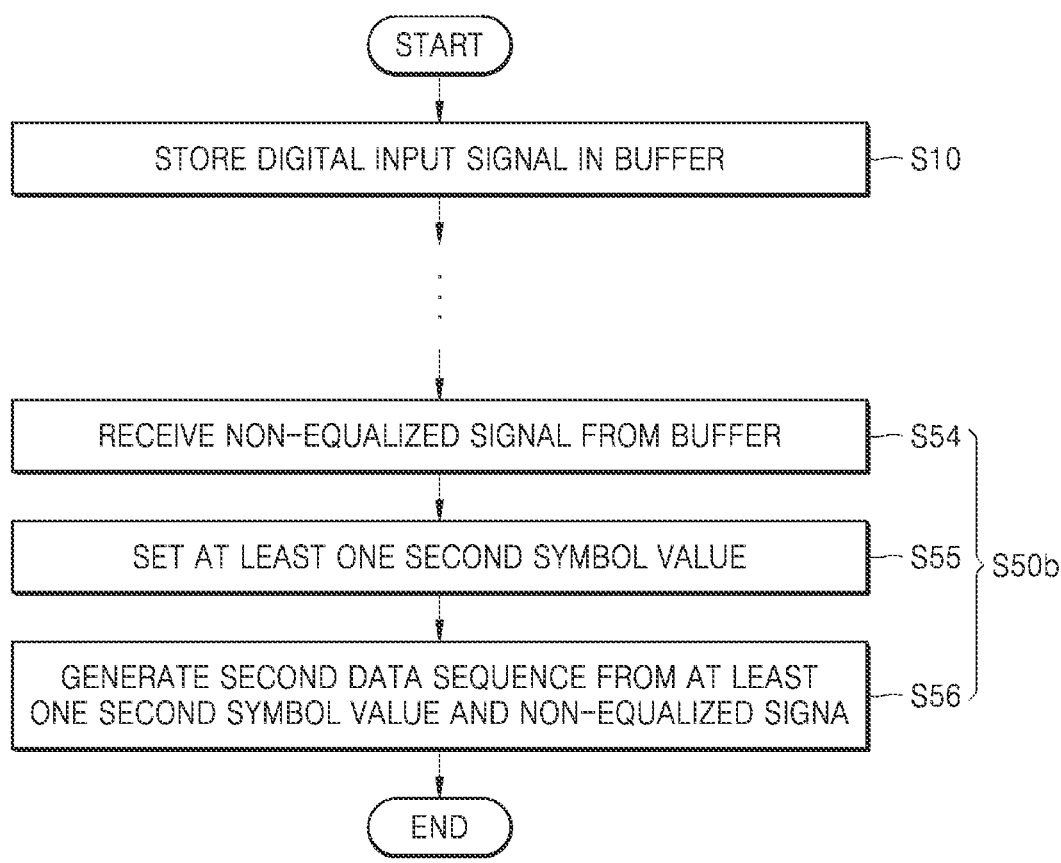

FIGS. 13A and 13B are flowcharts illustrating examples of a method for performing channel equalization based on error detection, according to exemplary embodiments of the disclosure. Specifically, the flowcharts of FIGS. 13A and 13B show examples of operation S50 of FIG. 11. As described above with reference to FIG. 11, in operation S50*a* of FIG. 13A and operation S50*b* of FIG. 13B, the second data sequence SEQ2 and the second equalized signal EQ2 are generated. In some embodiments, operation S50*a* of FIG. 13A is performed by the sequence estimation circuit 70 of FIG. 7, and operation S50*b* of FIG. 13B is performed by the sequence estimation circuit 94_4 of FIG. 9. Hereinafter, FIGS. 13A and 13B will be described with reference to FIGS. 7 and 9, and overlapping descriptions in relation to FIGS. 13A and 13B will be omitted.

Referring to FIG. 13A, operation S50*a* may include a plurality of operations S51, S52, and S53. In operation S51, a non-equalized signal NEQ is generated from the first equalized signal EQ1. For example, the inverse equalizer 72 of FIG. 7 may generate the non-equalized signal NEQ from the first equalized signal EQ1 by inversely performing an operation in which the equalization circuit 92 generates the first data sequence SEQ1 and the first equalized signal EQ1 from the digital input signal IN_D.

In operation S52, at least one second symbol value is set. For example, the partial equalizer 74 of FIG. 7 may set at least one second symbol value included in the second data sequence SEQ2 to a symbol value different from at least one first symbol value of the first data sequence SEQ1 assumed to include an error.

In operation S53, a second data sequence SEQ2 is generated from the at least one second symbol value and the non-equalized signal NEQ. For example, the partial equalizer 74 of FIG. 7 may generate the second data sequence SEQ2 based on the non-equalized signal NEQ provided by the inverse equalizer 72 and the at least one second symbol value set in operation S52. Accordingly, when an error is detected in the first data sequence SEQ1, the second data sequence SEQ2 may be selected instead of the first data sequence SEQ1 and may correspond to a version in which the error is corrected.

Referring to FIG. 13B, in operation S10, a digital input signal IN_D is stored in the buffer 98. For example, the buffer 98 of FIG. 9 may receive the digital input signal IN_D and store values of the digital input signal IN_D. In some embodiments, operation S10 may be performed before operation S20 of FIG. 11 is performed, and operation S50*b* of FIG. 13B may be performed after operation S30 and operation S40 of FIG. 11 are performed following operation S20. As shown in FIG. 13B, operation S50*b* may include a plurality of operations S54, S55, and S56.

In operation S54, the non-equalized signal NEQ is received from the buffer 98. For example, the sequence estimation circuit 94_4 of FIG. 9 may receive the non-equalized signal NEQ from the buffer 98. Accordingly, a component (e.g., the inverse equalizer 72 of FIG. 7) for generating the non-equalized signal NEQ from the first equalized signal EQ1 may be omitted from the sequence estimation circuit 94_4. Next, at least one second symbol value is set in operation S55, and in operation S56, a second data sequence SEQ2 is generated from the at least one second symbol value and the non-equalized signal NEQ. For example, the setting of the at least one symbol value may include setting at least one second symbol value included in the second data sequence SEQ2 to a symbol value different from at least one first symbol value of the first data sequence SEQ1 assumed to include an error (or predicted to possibly have an error).

Figure 14:
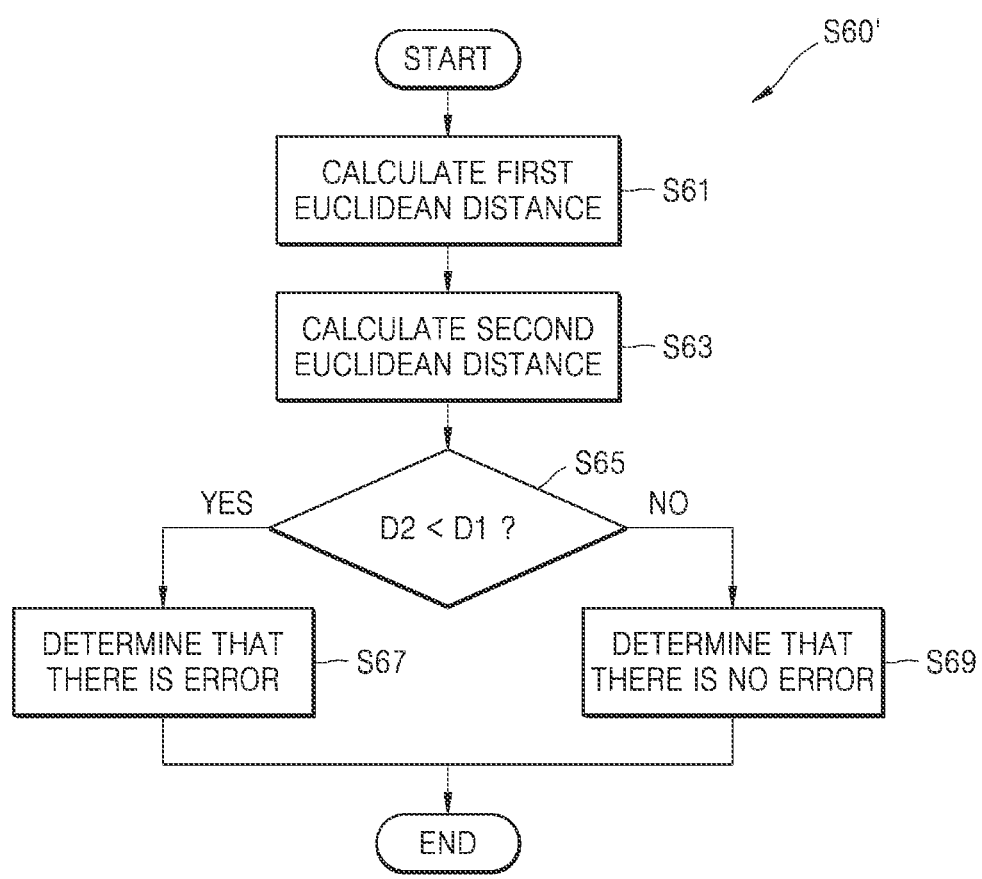
FIG. 14 is a flowchart of a method for performing channel equalization based on error detection, according to an exemplary embodiment of the disclosure.

FIG. 14 is a flowchart of a method for performing channel equalization based on error detection, according to an exemplary embodiment of the disclosure. Specifically, the flowchart of FIG. 14 shows an example of operation S60 of FIG. 11. As described above with reference to FIG. 11, an error of the first data sequence SEQ1 may be detected in operation S60' of FIG. 14. As shown in FIG. 14, operation S60' may include a plurality of operations S61, S63, S65, S67, and S69. In some embodiments, operation S60' may be performed by the error detection circuit 44_6 of FIG. 4, and FIG. 14 will be described below with reference to FIG. 4.

Referring to FIG. 14, a first Euclidean distance D1 is calculated in operation S61. For example, the error detection circuit 44_6 may calculate the first Euclidean distance D1 based on the first equalized signal EQ1 and the first data sequence SEQ1. The first Euclidean distance D1 may represent a degree of a discrepancy between the first equalized signal EQ1 and the first data sequence SEQ1 in n consecutive symbols.

In operation S63, a second Euclidean distance D2 is calculated. For example, the error detection circuit 44_6 may calculate the second Euclidean distance D2 based on the second equalized signal EQ2 and the second data sequence SEQ2. The second Euclidean distance D2 may represent a degree of a discrepancy between the second equalized signal EQ2 and the second data sequence SEQ2 in n consecutive symbols. In some embodiments, as described above with reference to FIG. 10A, operations S61 and S63 are performed in parallel. Furthermore, in some embodiments, as described above with reference to FIG. 10B, operations S61 and S63 are sequentially performed.

In operation S65, the first Euclidean distance D1 and the second Euclidean distance D2 are compared with each other. As shown in FIG. 14, when the second Euclidean distance D2 is less than the first Euclidean distance D1, that is, the degree of the discrepancy between the second equalized signal EQ2 and the second data sequence SEQ2 is lower than the degree of the discrepancy between the first equalized signal EQ1 and the first data sequence SEQ1, it is determined in operation S67 that there is an error in the first data sequence SEQ1. On the other hand, when the first Euclidean distance D1 is less than the second Euclidean distance D2, that is, the degree of the discrepancy between the first equalized signal EQ1 and the first data sequence SEQ1 is lower than the degree of the discrepancy between the second equalized signal EQ2 and the second data sequence SEQ2, it is determined in operation S69 that there is no error in the first data sequence SEQ1.

Figure 15:
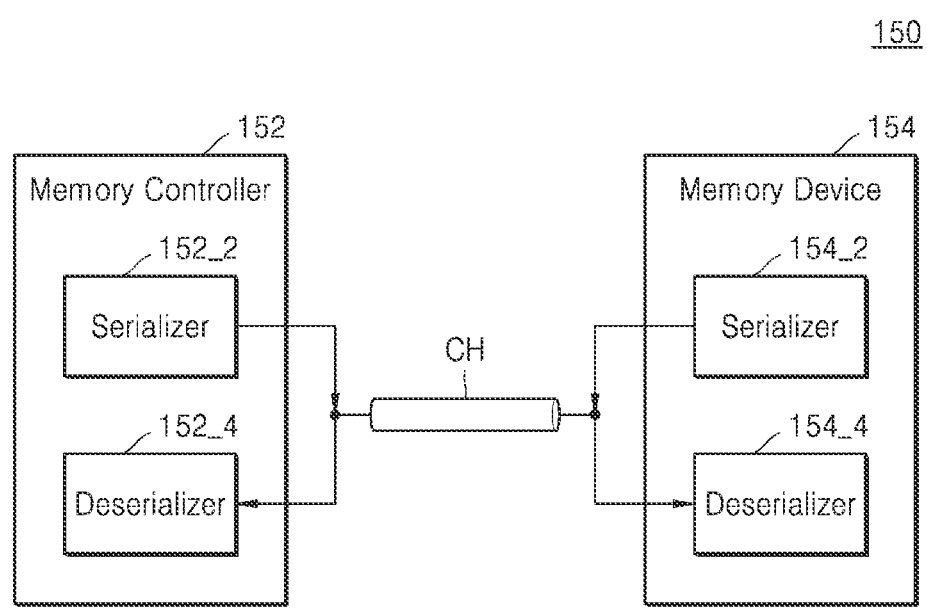
FIG. 15 is a block diagram of a system according to an exemplary embodiment of the disclosure.

FIG. 15 is a block diagram of a system 150 according to an exemplary embodiment of the disclosure. As shown in FIG. 15, the system 150 includes a memory controller 152 and a memory device 154, which communicate with each other through a channel CH. In some embodiments, the memory device 154 may include a volatile memory such as dynamic random access memory (DRAM) or static random access memory (SRAM), or may include a non-volatile memory such as flash memory and resistive random access memory (RRAM). In some embodiments, the system 150 may be a computing system including a processor, which executes a series of instructions, and a bus, or may be a storage system in communication with a host.

The memory controller 152 and the memory device 154 may transmit and receive serialized signals through a channel CH. To this end, as shown in FIG. 15, the memory controller 152 may include a serializer 152_2 and a deserializer 152_4, and the memory device 154 may also include a serializer 154_2 and a deserializer 154_4. The serializers 152_2 and 154_2 may receive in parallel a signal to be transmitted to the counterpart, and may output a signal generated by serializing the received signal to the channel CH. Also, the deserializers 152_4 and 154_4 may receive a serialized signal through the channel CH, and may output in parallel a signal generated by deserializing the received signal. Serializers and deserializers may be referred to collectively as SerDes. In addition, the system 150 may employ multi-level signaling, such as 2-level pulse amplitude modulation (PAM-2), 4-level pulse amplitude modulation (PAM-4), or 8-level pulse amplitude modulation (PAM-8), for high data rates.

The deserializers 152_4 and 154_4 of FIG. 15 may each include a receiver described above with reference to the drawings (e.g., 10, 40, 90, etc.). Accordingly, errors due to noise occurring periodically or aperiodically in the channel CH may be detected and corrected, and propagation of errors in channel equalization may be prevented. As a result, a bit error rate may decrease in communication between the memory controller 152 and the memory device 154. Furthermore, detection and correction of errors may be performed only when an error is predicted, and accordingly, power consumption in the system 150 may be reduced. The serializers 152_2 and 154_2 may each include a transmitter described above with reference to the drawings (e.g., 5).

While the inventive concept has been particularly shown and described with reference to exemplary embodiments thereof, it will be understood that various changes in form and details may be made therein without departing from the spirit and scope of the inventive concept.

What is claimed is:

1. An apparatus configured to process an input signal including a series of symbols received through a channel, the apparatus comprising:
   an equalization circuit configured to generate a first data sequence and a first equalized signal from the input signal based on a decision feedback equalizer (DFE);
   a sequence estimation circuit configured to generate a second data sequence from a non-equalized signal corresponding to the input signal and to generate a second equalized signal corresponding to the second data sequence, the second data sequence including at least one second symbol value different from at least one first symbol value included in the first data sequence;
   an error detection circuit configured to detect a first error associated with the first data sequence based on the first equalized signal and the second equalized signal; and
   a selection circuit configured to output the second data sequence when the first error associated with the first data sequence is detected and to output the first data sequence when the first error associated with the first data sequence is not detected.

2. The apparatus of claim 1, wherein the sequence estimation circuit is further configured to set the at least one second symbol value to a value different from the at least one first symbol value.

3. The apparatus of claim 1, further comprising:
   an error prediction circuit configured to predict a second error in the first data sequence based on the first equalized signal and to enable the sequence estimation circuit when the second error is predicted.

4. The apparatus of claim 3, wherein the error detection circuit is further configured to detect the first error based on a first Euclidean distance derived from the first equalized signal and the first data sequence, and a second Euclidean distance derived from the second equalized signal and the second data sequence.

5. A method of processing an input signal including a series of symbols received through a channel, the method comprising:
   performing a channel equalization on an input signal to generate a first data sequence and a first equalized signal;
   predicting a first error associated with the first data sequence based on the first equalized signal;
   generating a second data sequence from a non-equalized signal corresponding to the input signal, when the first error is predicted;
   generating a second equalized signal corresponding to the second data sequence;
   performing an error detection to detect a second error associated with the first data sequence based on the first equalized signal and the second equalized signal; and
   outputting the second data sequence when the second error is detected and otherwise outputting the first data sequence.

6. The method of claim 5, wherein the predicting of the first error comprises:
   comparing a level of the first equalized signal with at least one range; and
   determining that the first error is predicted when the level of the first equalized signal is in the at least one range.

7. The method of claim 6, wherein the at least one range includes at least one threshold for determining a symbol value.

8. The method of claim 5, wherein the generating of the second data sequence comprises:
   setting a value different from at least one first symbol value included in the first data sequence to at least one second symbol value included in the second data sequence; and
   generating the second data sequence based on the non-equalized signal and the at least one second symbol value.

9. The method of claim 8, wherein the generating of the second data sequence further comprises generating the non-equalized signal from the first equalized signal.

10. The method of claim 5, wherein the detecting of the second error comprises:
    calculating a first Euclidean distance based on the first equalized signal and the first data sequence;
    calculating a second Euclidean distance based on the second equalized signal and the second data sequence; and
    detecting the second error based on the first Euclidean distance and the second Euclidean distance.

11. The method of claim 5, wherein the generating of the first data sequence and the first equalized signal and the generating of the second data sequence are based on a decision feedback equalizer (DFE).

12. An apparatus comprising:
    an equalization circuit configured to generate a first data sequence and a first equalized signal from an input signal received through a channel;

an error prediction circuit configured to predict a first error associated with the first data sequence based on the first equalized signal;

a sequence estimation circuit configured, when the first error is predicted, to generate a second data sequence from a non-equalized signal corresponding to the input signal and to generate a second equalized signal corresponding to the second data sequence;

an error detection circuit configured to detect a second error associated with the first data sequence based on the first equalized signal and the second equalized signal; and a selection circuit configured to output the second data sequence when the second error is detected and to otherwise output the first data sequence.

13. The apparatus of claim 12, wherein the error prediction circuit is further configured to determine that the first error is predicted when a level of the first equalized signal at a center of a unit interval (UI) is within at least one range.

14. The apparatus of claim 13, wherein the at least one range includes at least one threshold for determining a symbol value.

15. The apparatus of claim 12, wherein the sequence estimation circuit includes a partial equalizer configured to generate the second data sequence by setting at least one symbol value from the non-equalized signal corresponding to the input signal.

16. The apparatus of claim 15, wherein the sequence estimation circuit further includes an inverse equalizer configured to generate the non-equalized signal from the first equalized signal.

17. The apparatus of claim 12, wherein the error detection circuit is further configured to detect the second error based on a first Euclidean distance derived from the first equalized signal and the first data sequence, and a second Euclidean distance derived from the second equalized signal and the second data sequence.

18. The apparatus of claim 17, wherein the error detection circuit is further configured to determine an occurrence of the second error when the first Euclidean distance is greater than the second Euclidean distance.

* * * * *